(12) United States Patent
Lagin

(10) Patent No.: US 12,151,631 B2
(45) Date of Patent: Nov. 26, 2024

(54) ASSEMBLY FOR A VEHICLE

(71) Applicant: Kirchhoff Automotive Deutschland GmbH, Attendorn (DE)

(72) Inventor: Stephan Lagin, Attendorn (DE)

(73) Assignee: Kirchhoff Automotive Deutschland GmbH, Attendorn (DE)

( * ) Notice: Subject to any disclaimer, the term of this patent is extended or adjusted under 35 U.S.C. 154(b) by 0 days.

(21) Appl. No.: 17/912,589

(22) PCT Filed: May 4, 2021

(86) PCT No.: PCT/EP2021/061746
§ 371 (c)(1),
(2) Date: Sep. 19, 2022

(87) PCT Pub. No.: WO2021/224272
PCT Pub. Date: Nov. 11, 2021

(65) Prior Publication Data
US 2023/0131692 A1 Apr. 27, 2023

(30) Foreign Application Priority Data

May 5, 2020 (DE) .......................... 102020112125.3

(51) Int. Cl.
*B60R 19/34* (2006.01)
(52) U.S. Cl.
CPC .................... *B60R 19/34* (2013.01)
(58) Field of Classification Search
CPC ...................................................... B60R 19/34
(Continued)

(56) References Cited

U.S. PATENT DOCUMENTS 8,950,794 B2   2/2015 Lenkenhoff
9,174,594 B2 * 11/2015 Kim ...................... B60R 19/34
(Continued)

FOREIGN PATENT DOCUMENTS

DE   102006044384 A1   3/2008
DE   102009014822 A1   10/2010
(Continued)

OTHER PUBLICATIONS

Pending U.S. Appl. No. 17/915,057, filed Sep. 27, 2022, inventors Günther et al., applicant Kirchhoff Automotive Deutschland GmbH [Per MPEP 609.07, copy not provided as this is available in the USPTO system].

(Continued)

*Primary Examiner* — Jason S Morrow
(74) *Attorney, Agent, or Firm* — Polson Intellectual Property Law P.C.; Margaret Polson; Christopher Sylvain

(57) ABSTRACT

An assembly for a vehicle comprising a crash box configured as a hollow-chamber profile and a connection panel with means for connecting the crash box on the vehicle side approximately on a longitudinal carrier of a vehicle. The connection panel has at least one connecting tab projecting in the direction of the crash box and integrally connected to the crash box. The at least one connecting tab engages into the hollow-chamber of the crash box and is connected on the inside to a wall of the hollow-chamber profile by the flat side, and, in the region where a connecting tab of this type is attached to the hollow-chamber profile, the side wall has an embossing pointing into the inside of the hollow profile, with the connecting tab being connected to same at the top by the flat side.

16 Claims, 3 Drawing Sheets

(58) Field of Classification Search
USPC .................................. 296/187.09; 293/133
See application file for complete search history.

(56) References Cited

U.S. PATENT DOCUMENTS

| | | | |
|---|---|---|---|
| 9,446,799 B2 | 9/2016 | Franzpötter | |
| 9,598,100 B2 | 3/2017 | Lenkenhoff | |
| 9,764,764 B2 | 9/2017 | Irle | |
| 10,005,495 B2 | 6/2018 | Töller | |
| 10,150,437 B2* | 12/2018 | Duffe | B60R 19/34 |
| 10,286,865 B2* | 5/2019 | Nam | F16F 7/12 |
| 10,577,025 B2 | 3/2020 | Michler | |
| 10,661,741 B2* | 5/2020 | Kaneko | B60R 19/34 |
| 10,882,559 B2 | 1/2021 | Gündogan | |
| 11,142,248 B2 | 10/2021 | Günther | |
| 11,148,623 B2 | 10/2021 | Günther | |
| 11,235,720 B2 | 2/2022 | Höning | |
| 11,292,409 B2 | 4/2022 | Töller | |
| 11,505,146 B2 | 11/2022 | Weige | |
| 2009/0243312 A1* | 10/2009 | Handing | B60R 19/26 |
| | | | 293/132 |
| 2016/0144814 A1* | 5/2016 | Ahn | B23K 31/022 |
| | | | 293/133 |
| 2019/0344385 A1 | 11/2019 | Töller | |
| 2019/0351854 A1* | 11/2019 | Bae | B23K 20/06 |
| 2020/0108788 A1* | 4/2020 | Sportelli | B60R 19/03 |
| 2022/0009435 A1 | 1/2022 | Günther | |
| 2022/0024399 A1 | 1/2022 | Tlauka | |
| 2022/0258684 A1 | 8/2022 | Günther | |
| 2022/0281532 A1 | 9/2022 | Tentscher | |
| 2022/0289304 A1 | 9/2022 | Weige | |
| 2022/0297524 A1 | 9/2022 | Günther | |
| 2022/0314912 A1 | 10/2022 | Töller | |
| 2022/0363211 A1 | 11/2022 | Günther | |
| 2023/0039843 A1 | 2/2023 | Gündogan | |

FOREIGN PATENT DOCUMENTS

| | | |
|---|---|---|
| DE | 102011016055 A1 | 10/2012 |
| DE | 102012108699 A1 | 3/2014 |
| DE | 102012108699 B4 | 9/2019 |

OTHER PUBLICATIONS

Pending U.S. Appl. No. 17/914,465, filed Sep. 26, 2022, inventors Günther et al., applicant Kirchhoff Automotive Deutschland GmbH [Per MPEP 609.07, copy not provided as this is available in the USPTO system].

Pending U.S. Appl. No. 18/008,284, filed Dec. 5, 2022, inventors Günther et al., applicant Kirchhoff Automotive Deutschland GmbH [Per MPEP 609.07, copy not provided as this is available in the USPTO system].

International Search Report dated Jul. 13, 2021 in parent international application PCT/EP2021/061746.

Written Opinion of the International Searching Authority dated Jul. 13, 2021 in parent international application PCT/EP2021/061746.

* cited by examiner

ASSEMBLY FOR A VEHICLE

BACKGROUND

The present disclosure relates to an assembly for a vehicle, comprising a crash box configured as a hollow-chamber profile and a connection panel with means for connecting the crash box on the vehicle side approximately to a longitudinal carrier of a vehicle, in which assembly the connection panel has at least one connecting tab protruding in the direction of the crash box and which is integrally connected to the crash box.

Crash boxes are used in vehicles between a bumper crossmember and the chassis-side connection. Crash boxes are used to absorb energy in case of an impact affecting the bumper crossmember. Such crash boxes are hollow-chamber profile components. These can be extruded components made from an aluminum alloy suitable for this purpose or components produced from one or more steel plates. When using steel plates, such a crash box is typically assembled from two half-shells which are connected to one another by a weld seam in the longitudinal extension of the crash box on its legs. Connection panels—so-called baseplates—are used to connect such a crash box, configured as a hollow-chamber profile, to the vehicle chassis, wherein such a crash box is generally connected to a longitudinal carrier of the vehicle. These are connected on one side to the crash box. Such connection panels have a larger area than that occupied by the cross-sectional area of the crash box. Fastening passages are arranged in these regions, which project beyond the crash box transversely to the direction of travel. These are used as a means for connecting the connection plate to, for example, the end face of a vehicle-side longitudinal carrier. The longitudinal carrier can also be equipped with a connection panel at the end, so that in such a case the two connection panels are fastenable to one another back-to-back.

The crash box is usually welded to the connection panel, which reduces the strength of the metal structure of the crash box in the region of the heat influence zone. In addition, the weld seam as such only has a relatively low yield strength. Therefore, depending on the impact energy acting on the crash box, the connection of such a crash box to the connection panel can represent a critical region at which the connection to the connection panel tears. For this reason, assemblies of the type mentioned at the outset have been developed in which the connection panel has one or more connecting tabs projecting out of the same plane. Such an assembly is known, for example, from DE 10 2012 108 699 B4. These extended tabs, which are connected to the crash box in a materially-bonded manner, are used as a wall reinforcement in regions in the end section of the crash box bordering the connection panel. In the assembly previously known from DE 10 2012 108 699 B4, two connecting tabs are extended out of the plane of the connection panel in the direction of the hollow-chamber profile. With respect to the connection panel, these two connecting tabs are arranged so that one can be connected to the outside of the upper strap and the other to the outside of the lower strap of the crash box designed as a hollow-chamber profile. This measure is intended to prevent the profiled carrier from buckling depending on the impact energy, particularly in the case of low forces. In addition, by bending the connecting tabs out of the connection panel, the use of additional components to effectuate end-side reinforcement of the crash box can be dispensed with.

The problem with the use of reinforcement components or also with folded tabs, as known from DE 10 2012 108 699 B4, is that not all surface regions of the elements connected to one another are accessible to an anti-corrosion coating, for example via cathodic dip painting. Signs of corrosion can occur at this point due to the capillary forces between the components pressing against one another. These weaken the bond.

The demands on such an assembly or a vehicle equipped with it have increased significantly since the priority of DE 10 2012 108 699 B4.

SUMMARY

Proceeding from this background, an aspect of the present disclosure is to refine an assembly of the type mentioned at the outset in such a way that it also meets the increased demands placed on such an assembly.

This is achieved by a generic assembly of the type mentioned at the outset, in which the at least one connecting tab engages in the hollow chamber of the crash box and is connected on the inside with its flat side to a wall of the hollow-chamber profile and in which in the region of the connection of such a connecting tab to the hollow-chamber profile, the side wall has an embossing pointing into the hollow profile interior, at the apex of which the connecting tab is connected with its flat side.

In this assembly, the connection panel has at least one connecting tab projecting from its plane, which, in contrast to previously known configurations, however, is not connected to the outside of a wall of the crash box to be connected to the connection panel, but to the inside thereof. This is typically a side wall, i.e., a wall whose flat extension faces in the vehicle transverse direction. For the case that the connection panel of such an assembly carries only a single connecting tab, which is the case in a preferred example embodiment, this is in a position such that it is connected to the inside of the side wall, which faces outwards in the transverse direction, of the crash box designed as a hollow-chamber profile. The at least one connecting tab can be extended out of the plane of the connection panel by a bending or folding process. In such an embodiment, there is a curved bending zone between the planar extension of the extended connecting tab and the plane of the connection panel. According to another embodiment, it is provided that the connecting tab is a separate component that is welded to the connection panel. This separate component can be stamped out of the connection panel.

In the assembly, an embossing directed into the inside of the profile is introduced into that wall of the crash box hollow-chamber profile, to which the connecting tab is to be connected. The embossing has an embossing depth such that its apex, to which the connecting tab is connected with its flat side, effectuates spacing apart of the side wall and thus the end face of the hollow-chamber profile from the connecting tab. As a result of the distance provided by the embossing of the connecting tab from the side edge, the end face of the hollow-chamber profile is also located spaced apart from the root of the connecting tab and thus from a bending zone, for the case that the connecting tab is bent out of the plane of the connection panel, or from the weld seam, for the case that the connecting tab is welded to the connection plate. The spacing of the connecting tab from the planar extension of the side wall has the advantage on the one hand that, despite the connection of the connecting tab to the inside of a wall of the hollow-chamber profile, the end face thereof can press against the connection panel over its entire surface. This also has the advantage that a bending radius in the transition from the connecting tab to the plane of the connection panel does not have to be selected to be as small as possible, as is the case in the prior art, which would result in greater elongation on the tension side of the bending zone. Rather, in this assembly the bending zone can be formed having a larger radius in comparison to previously known connection panels, without this being disadvantageous for the connection of the crash box. Similarly, a weld seam, via which the connecting tab is welded to the connection plate, does not impair support of the hollow-chamber profile with its end face on the connection plate over the entire circumference.

Such a connecting tab typically has a passage dimensioned relatively large. This enables the application of an anti-corrosion layer, for example as a KTL coating, which also gets between the sides of the inner wall of the hollow-chamber profile facing one another and the outward-facing side of the connection flange. In this respect, the embossing introduced into the hollow-chamber profile wall reduces the contact area between this wall and the connecting tab. The contact area is limited to the apex or apex region of the embossing. The distance created by the embossing between the connecting tab and the inside of the hollow-chamber profile wall ensures that the paint flows in as intended and that paint that is not required flows out.

In order to optimally reinforce the hollow-chamber profile in the region of its connection to the connection panel, one example embodiment provides that the height of the connecting tab essentially corresponds to the height of that wall of the hollow-chamber profile to which it is to be connected. In this context, only the height of a wall of the hollow-chamber profile in its straight section is considered and thus without the transitions from one wall to the adjacent wall, which are typically curved with a radius. The footprint of the connecting tab can be rectangular. Another embodiment provides that the footprint is shaped trapezoidal, wherein the larger base side of the trapezoid faces in the direction of the connection panel. In the latter case, the reinforcing effect increases in the direction towards the connection panel due to the increasing cross-sectional area of the connecting tab in the end section of the crash box hollow-chamber profile.

The embossing of that wall of the hollow-chamber profile to which the connecting tab is connected on the inside is expediently a continuous embossing. This has a portion that extends in the longitudinal direction of the hollow-chamber profile and at least one other portion that runs in the transverse direction thereto. According to one example embodiment, such an embossing is designed in a U-shape, wherein the opening bordered by the legs of the embossing faces in the longitudinal extension of the hollow-chamber profile. In addition to the connecting tab connected to the inner wall of the hollow-chamber profile, the hollow-chamber profile is reinforced in its end section by the wall embossing. This is therefore also used to protect the front weld seam, with which the crash box is welded to the connection panel.

BRIEF DESCRIPTION OF THE DRAWINGS

In the following, the present disclosure is described in the context of example embodiments with reference to the accompanying figures, wherein.

DETAILED DESCRIPTION

Figure 2:
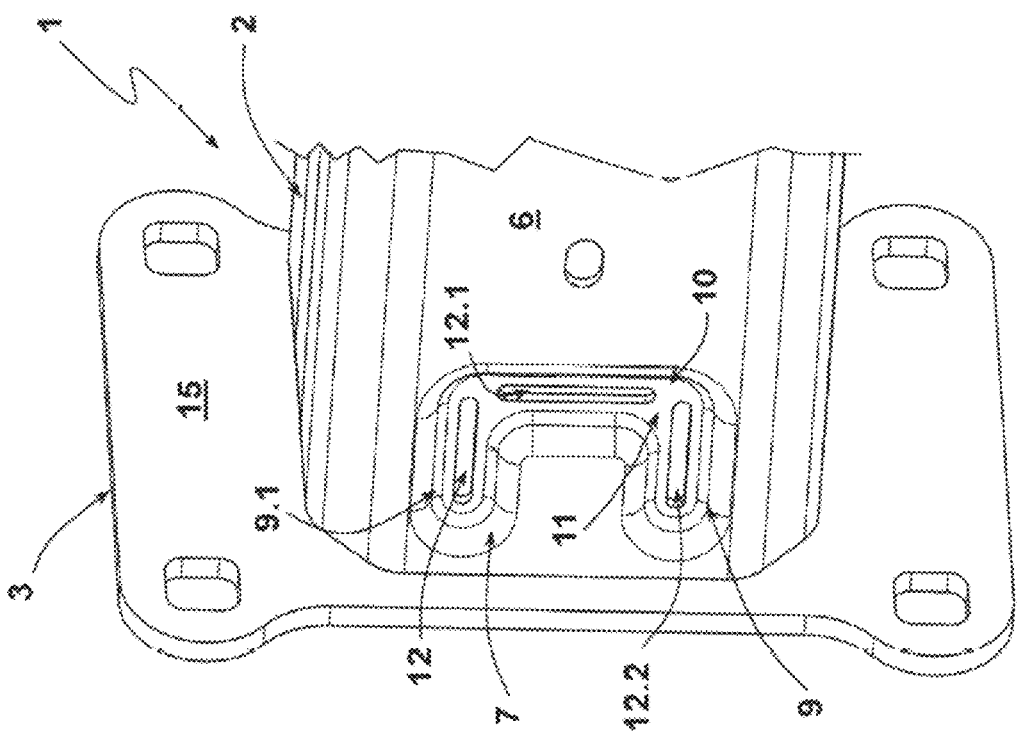
FIG. 2 shows a perspective view of the end portion of the crash box connected to the connection plate looking towards the front side of the connection plate.
Figure 1:
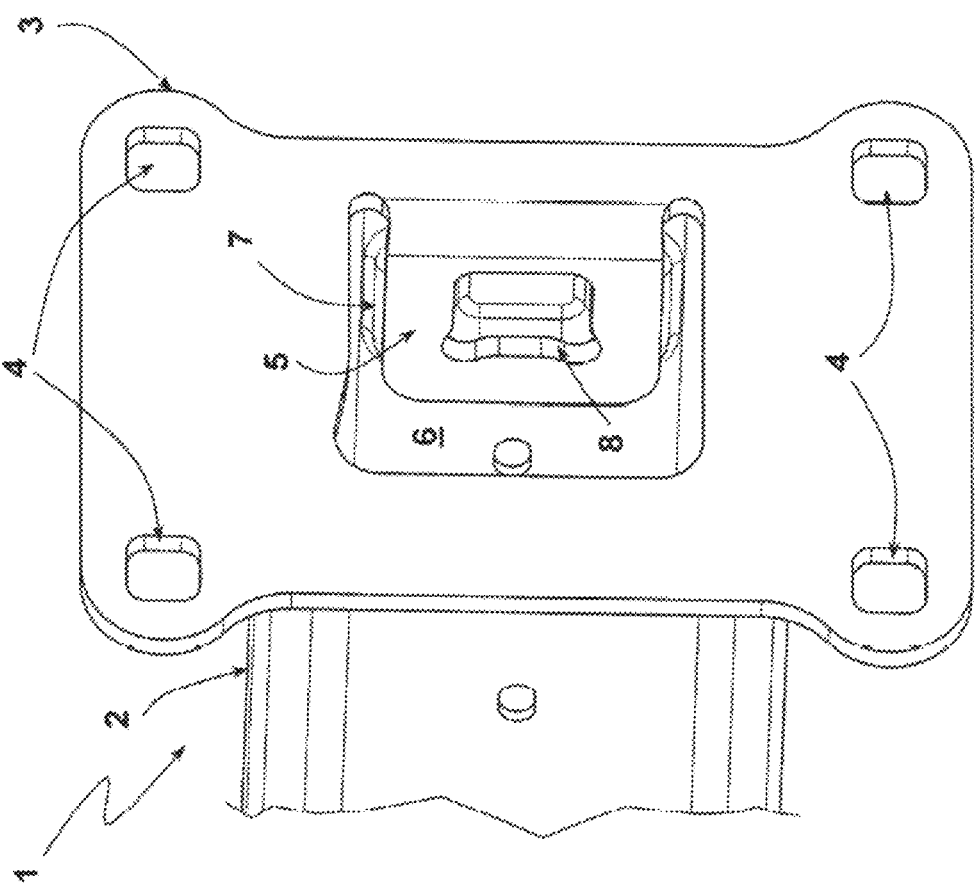
FIG. 1 shows a perspective view of an assembly for a vehicle comprising a crash box designed as a hollow-chamber profile and a connection panel looking towards the rear side of the connection panel.

An assembly 1 for a vehicle comprises a crash box 2 configured as a hollow-chamber profile. In the example embodiment shown, the crash box 2 is a steel component, produced in a manner known per se from two U-shaped half shells. The joining plane of the two half-shells, which is not shown in the figures, is in the x-z plane, wherein these directions correspond to the typical directions of a vehicle. The x-direction represents the longitudinal extension of the crash box 2, the z-direction represents the vertical direction, and the y-direction represents the direction running transversely to the longitudinal extension. In addition to the crash box 2, the assembly 1 comprises a connection plate 3, which can also be referred to as a base plate. The connection panel 3 forms a component with the crash box 2 since both parts are welded to one another. The connection panel 3 has a larger surface area than the cross-sectional area of the crash box 2 facing towards the connection panel 3. Two fastening passages 4 are introduced into the upper and lower areas protruding beyond the crash box 2, which in the illustrated embodiment represent the connecting means using which the connection panel 3 can be connected, for example, to a longitudinal carrier of a vehicle. In the example embodiment shown, the connection panel 3 is a flat sheet steel part. It can certainly be provided that the outer edge of the connection panel 3 has a collar, which is bent over in relation to the actual plate, in sections or even all the way around for reinforcement. Typically, this is designed to protrude in the direction of the crash box 2. Within the region bordered by the end face of the crash box 2 facing toward the connection panel 3, a connecting tab 5 is extended out of the plane of the connection panel 3 in the direction of the crash box 2 into the hollow chamber, specifically in the example embodiment shown angled by 90° relative to the plane of the connection panel 3. The connecting tab 5 is located in the x-z plane and is extended in the direction toward the side wall 6 of the crash box 2 which faces outwards and thus faces away from the central longitudinal axis. The surface of the connecting tab 5 facing towards the side wall 6 presses against the apex of an embossing 7 which is introduced into the side wall 6 from the outside and is thus directed into the interior of the hollow profile. The connecting tab 5 has a relatively large-format punch out 8 by which a passage is provided.

The embossing 7 can be seen in FIG. 2 looking toward the outside of the side wall 6. The embossing 7 is U-shaped, wherein the two legs 9, 9.1 point in the longitudinal extension of the crash box 2, while the web 10 connecting the legs 9, 9.1 runs in the vertical direction (z-direction). In this example embodiment, the opening of the embossing 7 formed by the legs 9, 9.1 points in the direction of the connection panel 3. The embossing 7 has an uncurved apex region 11, which extends through the entire embossing 7, when viewed from the outside of the side wall 6. Three passages 12, 12.1, 12.2 like oblong holes are introduced into this apex region 11. These are used to weld the connecting tab 5 to the side of the apex region 11 located in the interior of the hollow-chamber profile. The passages 12, 12.1, 12.2 follow the U-shaped geometry of the embossing 7.

Figure 3:
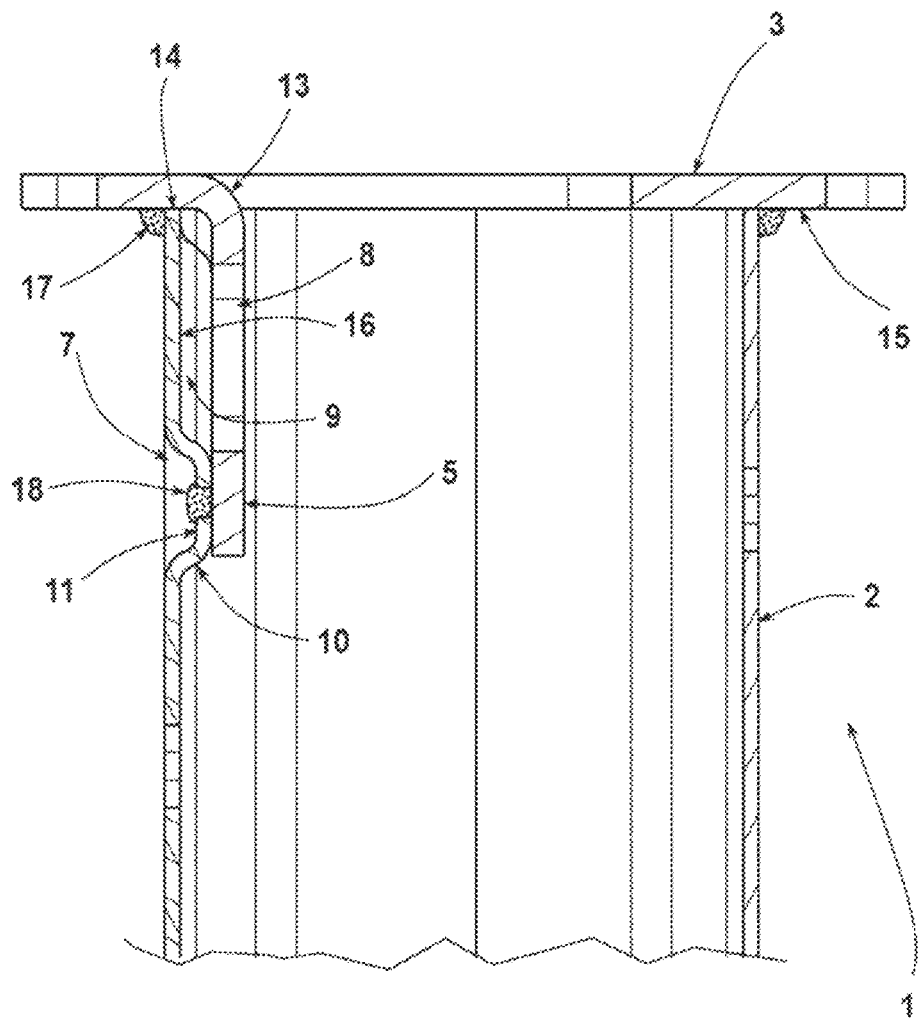
FIG. 3 shows a sectional view through the assembly of FIGS. 1 and 2 in its horizontal central longitudinal plane.

The formation of the embossing 7 in the region of its web 10 with the passage 12.1 introduced therein can be seen in the sectional view of FIG. 3. With its side facing towards the inside of the side wall 6, the connecting tab 5 presses against the uncurved apex region 11 of the embossing 7. The connecting tab 5 is formed onto the connection panel 3 with a bending zone 13 interposed. The radius shown is dimensioned quite large in relation to conventional bending radii for such tabs. The depth of the embossing 7 is set such that the end face 14 of the crash box 2 is spaced apart from the bending zone 13. This ensures that the end face 14 of the crash box 2 presses circumferentially unimpaired against the front side 15 of the connection panel 3 facing towards the crash box 2. The illustration in FIG. 3 also makes it clear that the end face 14 presses circumferentially against the front side 15 of the connection panel 3. This means that the end face 14 does not have to bridge any passages made in the connection panel 3, as is the case when a connecting tab extending from the plane of the connection panel is connected to the outside of a wall of the crash box. In this respect, in this assembly 1 the introduction of force from the crash box 2 into the connection panel 3 via the end face 14 is circumferentially equal, which in turn improves the crash performance.

The sectional view in FIG. 3 makes it clear that the wall 6 of the crash box 2 facing outwards is reinforced both by the embossing 7 and by the connecting tab 5. The structure formed due to the distance of the connecting tab 5 from the inside 16 of the side wall 6 is box-like. The joint connection between the connecting tab 5 and the side wall 6 in the apex region 11 provides a box profile, which structure has a higher rigidity than solely the sum of the connecting tab 5 and the material thickness of the side wall 6, as is the case in previously known designs. Shear forces are absorbed particularly effectively in this way, without the weld seam 17 shown in FIG. 3, which connects the crash box 2 to the connection panel 3, being overstressed. The weld created within the opening 12.1 for welding the connecting tab 5 to the side wall 6 is also identified by the reference number 18.

Figure 4:
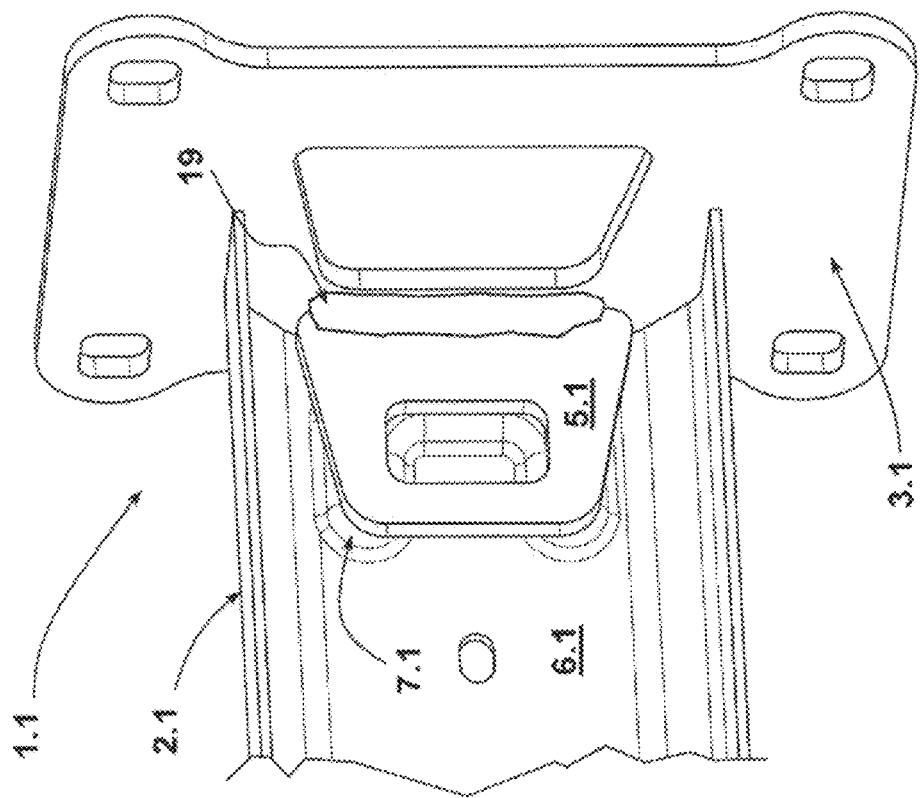
FIG. 4 shows a perspective view of another assembly corresponding to that of the preceding figures, but with a different embodiment of an end section reinforcement.

FIG. 4 shows a further example embodiment of an assembly 1.1, which in principle has the same structure as the assembly 1 described above. The above statements therefore apply similarly to assembly 1.1, which is shown in FIG. 4 with only one half-shell of its crash box 2.1. In the assembly 1.1, the embossing 7.1 is also U-shaped, but the opening of this embossing 7.1 faces away from the connection panel 3.1. In addition, the assembly 1.1 differs from the assembly 1 in that the connecting tab 5.1 is made trapezoidal, wherein the broader base of the trapezoidal shape of the connecting tab 5.1 faces in the direction of the connection panel 3.1. In this example embodiment, the connecting tab 5.1 is punched out of the connection panel 3.1 and is welded to the connection panel 3.1 with its base side, typically on both sides with a fillet weld 19 on each side.

Figure 5:
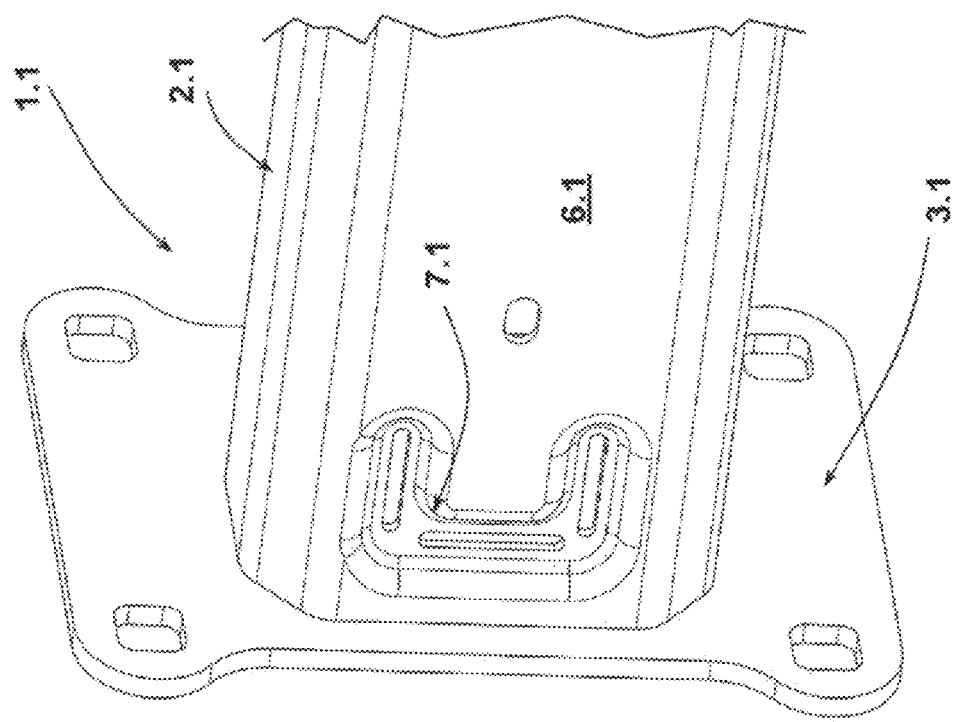
FIG. 5 shows a perspective view from the outside of the front side of the connection panel of the assembly of FIG. 4.

FIG. 5 shows an external view of the shell of the crash box 2.1 shown in FIG. 4 with the embossing 7.1 introduced into the side wall 6.1 therein.

The invention has been described on the basis of example embodiments. Without departing the scope of the claims, numerous further options and possibilities result for a person skilled in the art for implementing the invention, without these having to be explained or shown in greater detail in the context of this disclosure.

LIST OF REFERENCE NUMERALS

1, 1.1 assembly
2, 2.1 crash box
3, 3.1 connection panel
4 fastening passage
5, 5.1 connecting tab
6, 6.1 side wall
7, 7.1 embossing
8 passage
9, 9.1 leg
10 web
11 apex region
12, 12.1, 12.2 passage
13 bending zone
14 end face
15 front side
16 inside
17 weld seam
18 weld
19 fillet weld

The invention claimed is:

1. An assembly for a vehicle, comprising:
a crash box configured as a hollow-chamber profile and a connection panel with means for connecting to a vehicle member,
wherein the connection panel has at least one connecting tab protruding in a direction of the crash box and integrally connected to the crash box,
wherein the at least one connecting tab engages into the hollow-chamber profile of the crash box and is connected on an inside of the hollow-chamber profile to a side wall of the hollow-chamber profile by a flat side of the connecting tab, and
wherein, in a region where a connecting tab is attached to the hollow-chamber profile, the side wall has an embossing pointing into the inside of the hollow-chamber profile, with the flat side of the connecting tab being connected to the embossing at an apex of the embossing.

2. The assembly of claim 1, wherein a height of the at least one connecting tab essentially corresponds to a height of the side wall of the hollow-chamber profile to which the connecting tab is connected.

3. The assembly of claim 1, wherein the at least one connecting tab has a passage, and the connecting tab is connected to the embossing with at least one joint which is spaced apart from an edge of the passage toward an outer edge of the connecting tab.

4. The assembly of claim 1, wherein the at least one connecting tab has an area in relation to a plane of the connection panel which corresponds to more than half of an inner cross-sectional area of the hollow-chamber profile.

5. The assembly of claim 1, wherein the connection panel carries only a single connecting tab.

6. The assembly of claim 1, wherein the embossing, in a plane of the side wall, has a structure which extends both in a direction of a longitudinal extent of the hollow-chamber profile and in a transverse direction thereto, and which essentially corresponds to an extension of the connecting tab connected thereto in the direction of the longitudinal extent of the hollow-chamber profile and in the transverse direction thereto.

7. The assembly of claim 6, wherein the embossing is U-shaped, with an opening bordered by legs of the embossing, and wherein the opening of the embossing bordered by the legs faces in a direction of the longitudinal extension of the hollow-chamber profile.

8. The assembly of claim 7, wherein the opening of the embossing faces in a direction of the connection panel.

9. The assembly of claim 1, wherein the embossing has an uncurved apex region to which the connecting tab is connected.

10. The assembly of claim 1, wherein one or more passages are introduced into the apex region of the embossing, in which passages the connecting tab is welded to the side wall.

11. The assembly of claim 10, wherein the one or more passages are shaped as oblong holes.

12. The assembly of claim 1, wherein the at least one connecting tab has a rectangular footprint.

13. The assembly of claim 1, wherein the at least one connecting tab has a trapezoidal footprint, and a base of the trapezoidal footprint faces in the direction of the connection panel.

14. The assembly of claim 1, wherein the connecting tab is exposed from the connection panel by a bending process and the connecting tab is connected to the connection panel via a bending zone.

15. The assembly of claim 1, wherein the connecting tab is connected to the connection panel by a welded connection.

16. The assembly of claim 15, wherein the connecting tab is punched out of the connection panel.

\* \* \* \* \*